United States Patent
Fujimura

(10) Patent No.: US 9,183,860 B2
(45) Date of Patent: Nov. 10, 2015

(54) SUSPENSION BOARD WITH CIRCUIT AND HEAD GIMBAL ASSEMBLY

(71) Applicant: NITTO DENKO CORPORATION, Osaka (JP)

(72) Inventor: Yoshito Fujimura, Osaka (JP)

(73) Assignee: NTT DENKO CORPORATION, Osaka (JP)

(*) Notice: Subject to any disclaimer, the term of this patent is extended or adjusted under 35 U.S.C. 154(b) by 0 days.

(21) Appl. No.: 14/566,056

(22) Filed: Dec. 10, 2014

(65) Prior Publication Data

US 2015/0187377 A1    Jul. 2, 2015

(30) Foreign Application Priority Data

Dec. 27, 2013 (JP) ................. 2013-271947

(51) Int. Cl.
*G11B 5/56*   (2006.01)
*G11B 5/48*   (2006.01)
*G11B 5/55*   (2006.01)
*G11B 21/24*  (2006.01)

(52) U.S. Cl.
CPC .............. *G11B 5/4833* (2013.01); *G11B 5/482* (2013.01); *G11B 5/5552* (2013.01)

(58) Field of Classification Search
CPC .. G11B 5/5552; G11B 5/4826; G11B 5/4853; G11B 21/10; G11B 5/4873; G11B 5/596; G11B 5/5556; G11B 5/482; G11B 5/4833

USPC .............. 360/294.4, 245.3, 245.7, 245.8
See application file for complete search history.

(56) References Cited

U.S. PATENT DOCUMENTS

| 8,754,575 B2* | 6/2014 | Ikeji et al. .................... 310/348 |
| 8,837,091 B2* | 9/2014 | Arai ........................... 360/294.4 |
| 2011/0149440 A1* | 6/2011 | Uematsu et al. ............ 360/245.3 |
| 2012/0087041 A1 | 4/2012 | Ohsawa |
| 2012/0196152 A1* | 8/2012 | Mashimo et al. .............. 428/800 |
| 2014/0168813 A1* | 6/2014 | Tao et al. ......................... 360/75 |

FOREIGN PATENT DOCUMENTS

JP    2012-099204 A    5/2012

* cited by examiner

*Primary Examiner* — Will J Klimowicz
(74) *Attorney, Agent, or Firm* — Jean C. Edwards, Esq.; Edwards Neils PLLC

(57) ABSTRACT

A suspension board with circuit includes a piezoelectric element mounting portion for mounting thereon a piezoelectric element. The conductive pattern is configured to be electrically connected to the piezoelectric element. The piezoelectric element mounting portion includes a facing portion placed on one side of a bonding agent for bonding the piezoelectric element to the piezoelectric element mounting portion in an expanding/contracting direction of the piezoelectric element so as to face the bonding agent. The facing portion is configured to be pressed by the bonding agent when the piezoelectric element bonded to the piezoelectric element mounting portion expands/contracts.

12 Claims, 17 Drawing Sheets

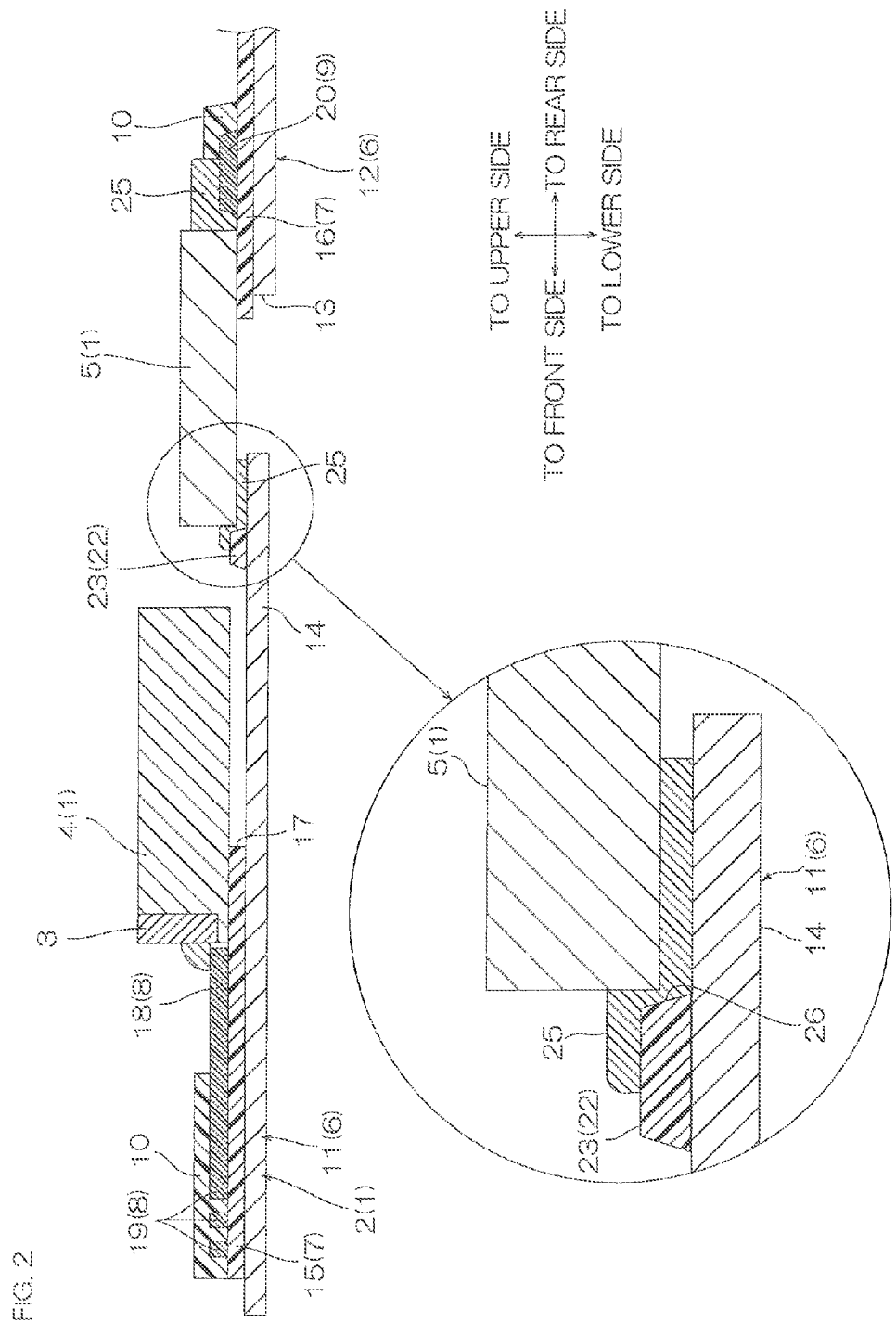

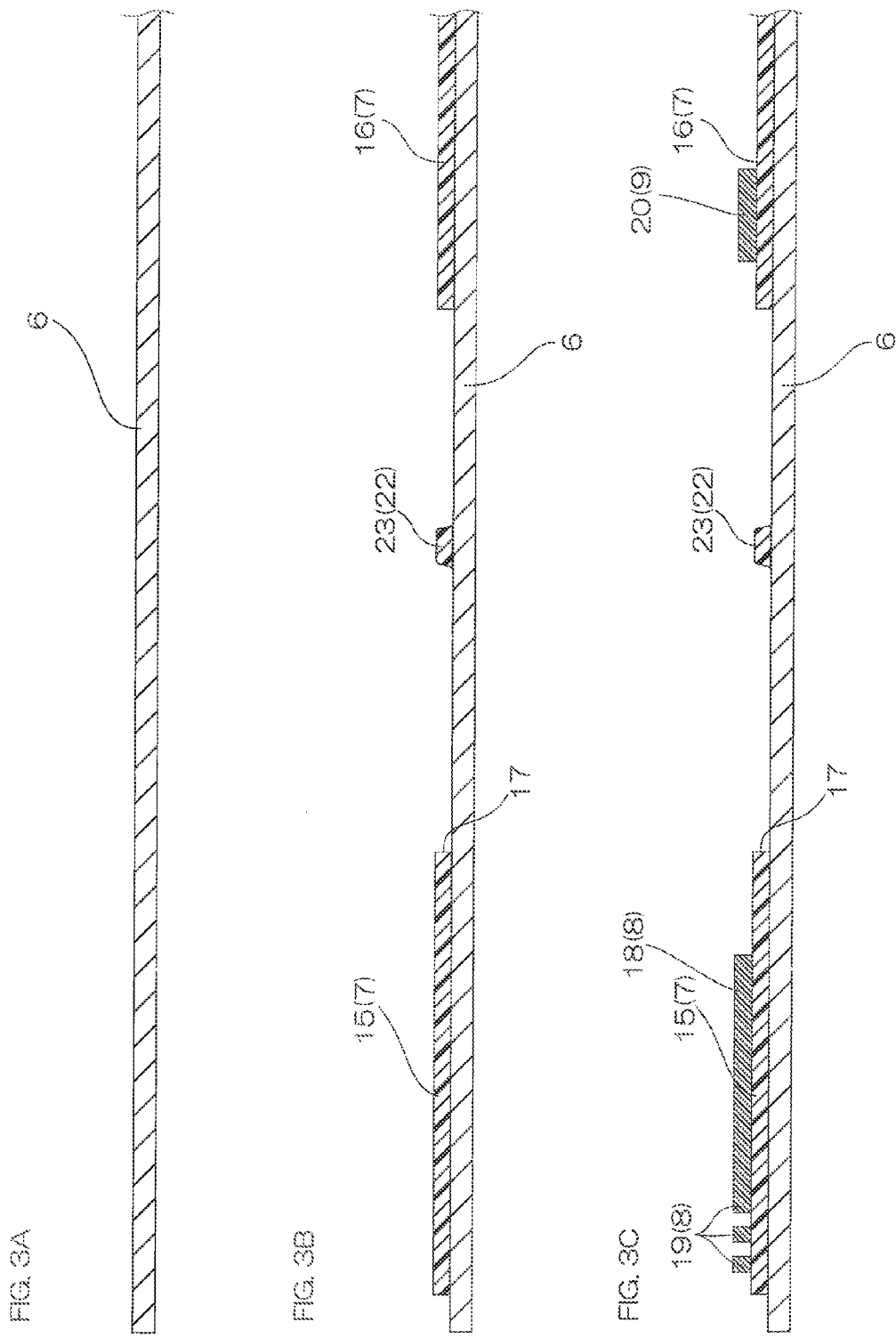

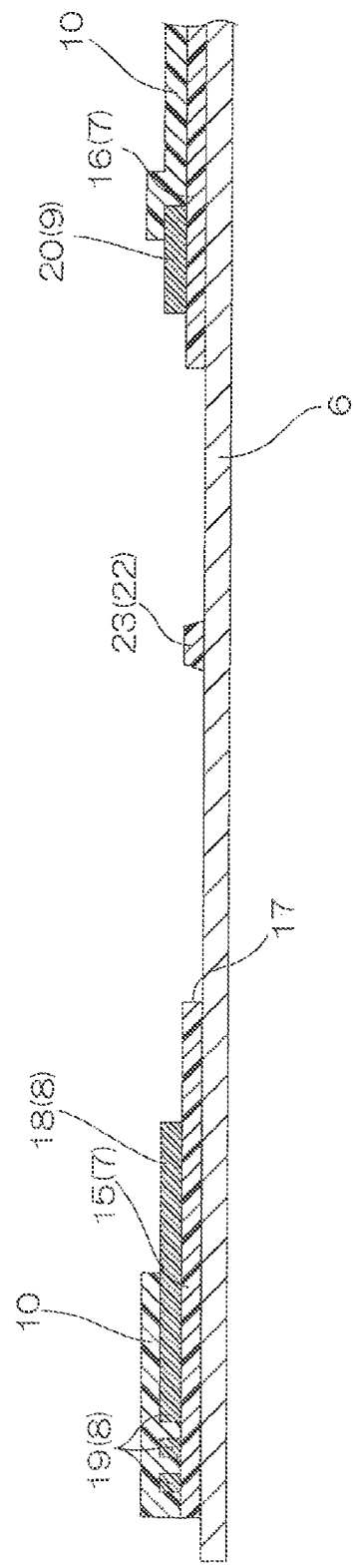
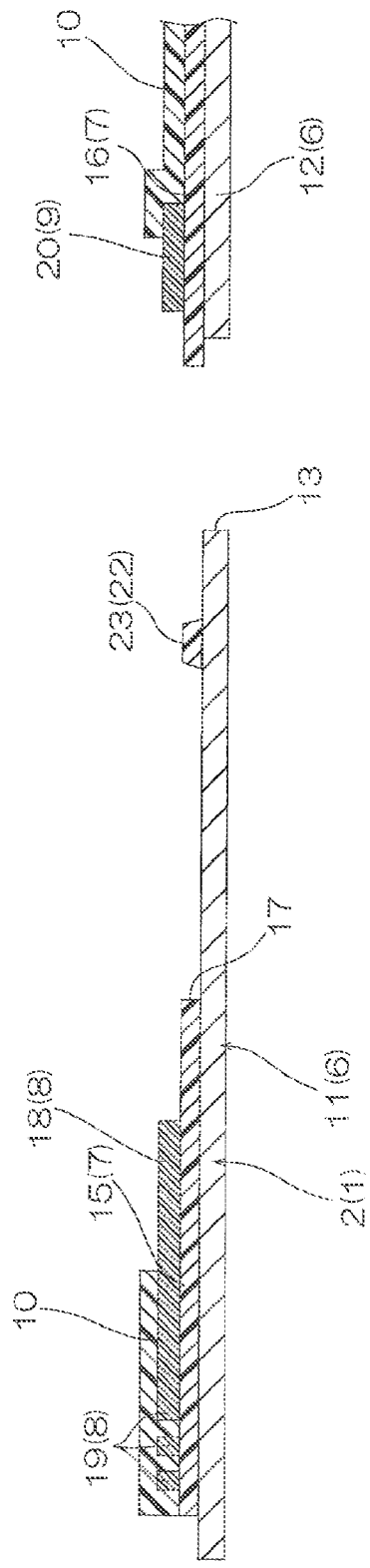

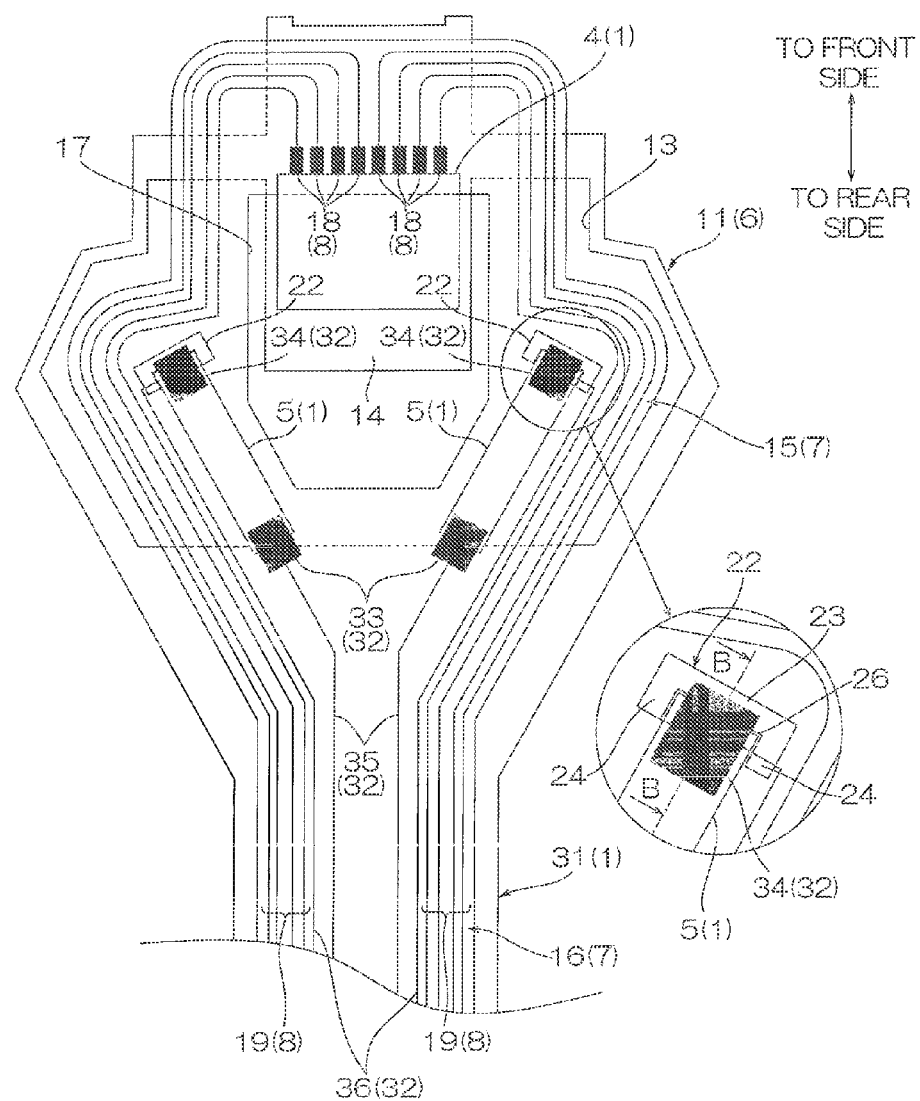

TO FRONT SIDE ←——→ TO REAR SIDE

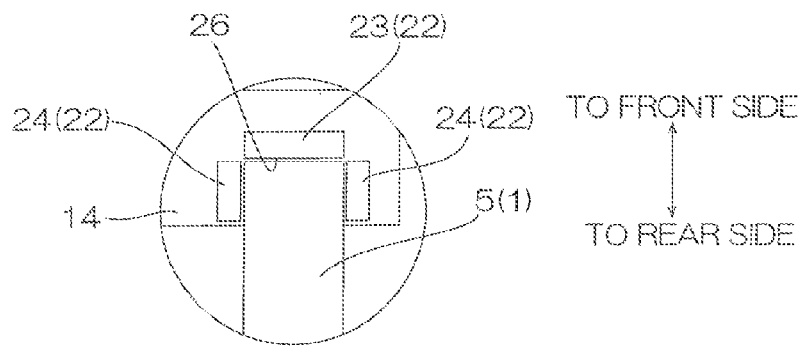
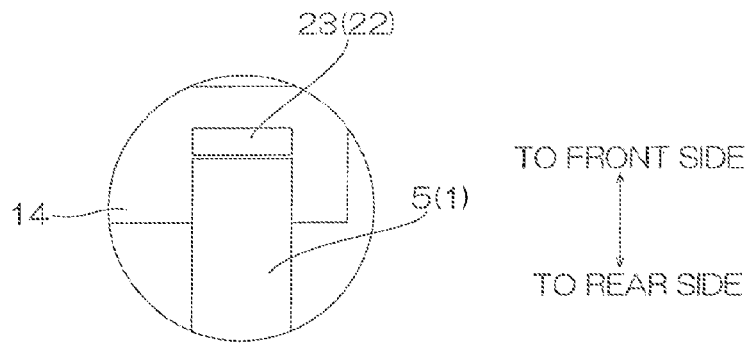
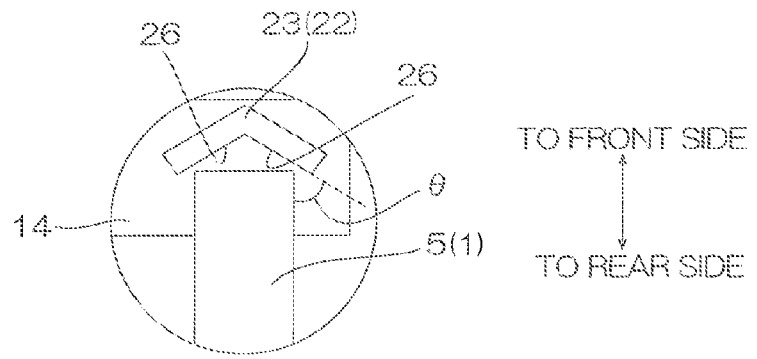

100# SUSPENSION BOARD WITH CIRCUIT AND HEAD GIMBAL ASSEMBLY

CROSS-REFERENCE TO RELATED APPLICATION

The present application claims priority from Japanese Patent Application No. 2013-271947 filed on Dec. 27, 2013, the content of which is herein incorporated by reference into this application.

BACKGROUND OF THE INVENTION

1. Field of the Invention

The present invention relates to a suspension board with circuit, and particularly to a suspension board with circuit and a head gimbal assembly which are used in a hard disk drive.

2. Description of the Related Art

A suspension board with circuit has been known which is used in a hard disk drive and on which a magnetic head is mounted.

As an example of such a suspension board with circuit, a suspension board with circuit has been proposed on which a microactuator such as a piezo-element (piezoelectric element) is mounted to, e.g., precisely and finely adjust the positon and angle of a magnetic head (see, e.g., Japanese Unexamined Patent No. 2012-99204).

SUMMARY OF THE INVENTION

However, in a suspension board with circuit as shown in Japanese Unexamined Patent No. 2012-99204 described above, when a magnetic head is moved, a distance over which the magnetic head moves may be shorter than a distance over which a piezo-element expands/contracts.

In this case, to move the magnetic head to an intended position, it is necessary to increase the distance over which the piezo-element expands/contracts. However, this leads to difficulty in achieving a reduction in power consumption.

It is therefore an object of the present invention to provide a suspension board with circuit and a head gimbal assembly which allow a magnetic head to be efficiently moved and achieve a reduction in power consumption.

A suspension board with circuit of the present invention includes a metal supporting board, an insulating base layer provided on the metal supporting board, a conductive pattern provided on the insulating base layer, a piezoelectric element mounting portion for mounting thereon a piezoelectric element, and a slider mounting portion for mounting thereon a slider including a magnetic head, the slider mounting portion being movable with expansion/contraction of the piezoelectric element. The conductive pattern is configured to be electrically connected to the piezoelectric element. The piezoelectric element mounting portion includes a facing portion placed on one side of a bonding agent for bonding the piezoelectric element to the piezoelectric element mounting portion in an expanding/contracting direction of the piezoelectric element so as to face the bonding agent. The facing portion is configured to be pressed by the bonding agent when the piezoelectric element bonded to the piezoelectric element mounting portion expands/contracts.

In such a configuration, the piezoelectric element mounting portion on which the piezoelectric element is mounted is provided with the facing portion which faces the bonding agent for bonding the piezoelectric element.

Accordingly, the force resulting from the expansion/contraction of the piezoelectric element can efficiently be transmitted to the piezoelectric element mounting portion via both of the bonding agent and the facing portion.

As a result, compared to the case where no facing portion is provided, it is possible to efficiently move the magnetic head to an intended position, while reducing the distance over which the piezoelectric element expands/contracts.

This allows a reduction in power consumption.

In the suspension board with circuit of the present invention, it is preferable that the facing portion defines at least a part of a region of the piezoelectric element mounting portion where the bonding agent is placed.

Such a configuration can allow the bonding agent to reliably stay in the vicinity of the facing portion.

As a result, it is possible to allow the facing portion and the bonding agent to reliably face each other.

In the suspension board with circuit of the present invention, it is preferable that the piezoelectric element mounting portion has a restraining portion placed to face the bonding agent in a direction perpendicular to the expanding/contracting direction.

In such a configuration, when the piezoelectric element is bonded, it is possible to restrain the flow of the bonding agent in the direction perpendicular to the expanding/contracting direction using the restraining portion.

As a result, it is possible to allow the bonding agent to more reliably stay in the vicinity of the facing portion and allow the facing portion and the bonding agent to more reliably face each other.

In the suspension board with circuit of the present invention, it is preferable that the restraining portion is formed integrally with the facing portion.

In such a configuration, the facing portion can be reinforced using the restraining portion and efficiently receive a pressing force from the bonding agent.

In the suspension board with circuit of the present invention, it is preferable that the facing portion is formed of at least either one of the metal supporting board and the insulating base layer.

Such a configuration allows the facing portion to be efficiently formed using at least either one of the metal supporting board and the insulating base layer.

It is preferable that the suspension board with circuit of the present invention further includes an insulating cover layer provided on the insulating base layer so as to cover the conductive pattern and the facing portion is formed of the insulating cover layer.

Such a configuration allows the facing portion to be efficiently formed using the insulating cover layer covering the conductive pattern.

In the suspension board with circuit of the present invention, it is preferable that the facing portion has a facing surface which crosses the expanding/contracting direction so as to form an angle of 45° to 90° therebetween.

In such a configuration, the facing surface crosses the expanding/contracting direction so as to form an angle of 45° to 90° therebetween. This allows the facing portion to reliably receive the pressing force from the bonding agent.

As a result, the force resulting from the expansion/contraction of the piezoelectric element can reliably be transmitted to the facing portion.

In the suspension board with circuit of the present invention, it is preferable that the bonding agent is a conductive adhesive.

In such a configuration, the bonding agent is the conductive adhesive. Therefore, it is possible to efficiently move the magnetic head and achieve a reduction in power consumption.

In the suspension board with circuit of the present invention, it is preferable that the bonding agent is a solder.

In such a configuration, the bonding agent is the solder. Therefore, it is possible to efficiently move the magnetic head and achieve a reduction in power consumption.

A head gimbal assembly of the present invention includes the suspension board with circuit described above, a piezoelectric element supported on the suspension board with circuit, and a slider on which a magnetic head is mounted and which is supported on the suspension board with circuit so as to move with expansion/contraction of the piezoelectric element. The piezoelectric element has one end portion thereof in the expanding/contracting direction which is electrically bonded to the conductive pattern via the bonding agent. The piezoelectric element has the other end portion thereof in the expanding/contracting direction which is electrically bonded to the metal supporting board or the conductive pattern via the bonding agent. The facing portion faces at least either one of the one end portion and the other end portion of the piezoelectric element in the expanding/contracting direction.

In such a configuration, the head gimbal assembly includes the suspension board with circuit described above. Therefore, it is possible to efficiently move the magnetic head and achieve a reduction in power consumption.

In the head gimbal assembly of the present invention, it is preferable that the other end portion of the piezoelectric element in the expanding/contracting direction is electrically bonded to the metal supporting board.

Such a configuration allows the piezoelectric element to be placed using the metal supporting board.

As a result, it is possible to simplify the configuration of the suspension board with circuit.

BRIEF DESCRIPTION OF THE DRAWINGS

FIG. 2 is a cross-sectional view along the line A-A of FIG. 1;

FIG. 3A is an illustrative view illustrating a method of producing the suspension board with circuit shown in FIG. 1 and showing the step of preparing a metal supporting board, FIG. 3B is an illustrative view illustrating the method of producing the suspension board with circuit shown in FIG. 1 and showing the step of forming an insulating base layer and a facing portion, and FIG. 3C is an illustrative view illustrating a method of producing the suspension board with circuit shown in FIG. 1 and showing the step of forming a first conductive pattern and a second conductive pattern;

FIG. 4A is an illustrative view illustrating the method of producing the suspension board with circuit subsequently to FIGS. 3A to 3C and showing the step of forming an insulating cover layer, and FIG. 4B is an illustrative view illustrating the method of producing the suspension board with circuit subsequently to FIGS. 3A to 3C and showing the step of trimming the metal supporting board;

FIG. 5 is a plan view showing a head gimbal assembly in a second embodiment;

FIG. 9A is an illustrative view illustrating the junction wall in another embodiment and showing a fifth embodiment, FIG. 9B is an illustrative view illustrating the junction wall in still another embodiment and showing a sixth embodiment, and FIG. 9C is an illustrative view illustrating the junction wall in yet another embodiment and showing a seventh embodiment;

DETAILED DESCRIPTION OF THE INVENTION (First Embodiment)

Figure 1:
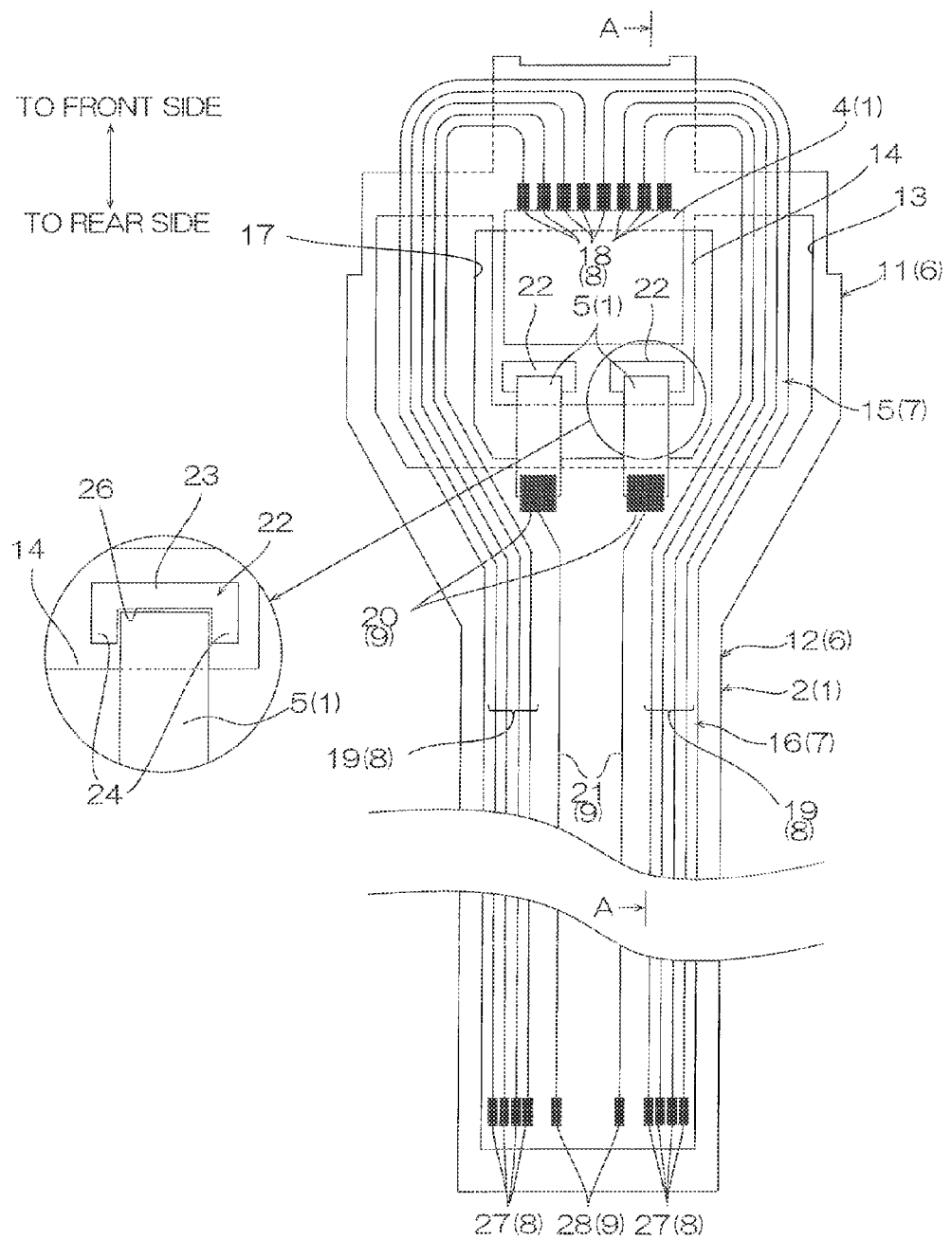
FIG. 1 is a plan view of a head gimbal assembly in a first embodiment of the present invention.

As shown in FIGS. 1 and 2, a head gimbal assembly 1 is formed in a flat belt shape extending in a vertical direction along the surface of each of the paper sheets with the drawings.

In the following description, when the directions of the head gimbal assembly 1 are mentioned, the vertical direction along the surface of the paper sheet with FIG. 1 is assumed to be a front-rear direction. The lateral direction along the surface of the paper sheet with FIG. 1 is assumed to be a widthwise direction. The upper side of the surface of the paper sheet with FIG. 1 corresponds to a front side. The lower side of the surface of the paper sheet with FIG. 1 corresponds to a rear side. The vertical direction along the surface of the paper sheet with FIG. 2 is assumed to be a thickness direction. The upper side of the surface of the paper sheet with FIG. 2 corresponds to one side in the thickness direction. The lower side of the surface of the paper sheet with FIG. 2 corresponds to the other side in the thickness direction.

The head gimbal assembly 1 includes a suspension board with circuit 2, a slider 4 on which a magnetic head 3 is mounted, and a plurality of (two) piezoelectric elements 5. The head gimbal assembly 1 is mounted on the load beam of a hard disc drive (not shown).

The suspension board with circuit 2 includes a metal supporting board 6, an insulating base layer 7, a first conductive pattern 8, a second conductive pattern 9 as a conductive pattern, and an insulating cover layer 10.

The metal supporting board 6 is formed in a flat belt shape extending in a longitudinal direction so as to form the outer shape of the suspension board with circuit 2. The metal supporting board 6 integrally includes a head supporting portion (gimbal portion) 11, and a wire supporting portion 12.

The head supporting portion 11 is located in the front end portion of the metal supporting board 6. The head supporting portion 11 is formed in a generally rectangular shape in plan view having a tapered rear end portion. The head supporting portion 11 is formed with a board opening 13. The head supporting portion 11 includes a tongue portion 14.

The board opening 13 is located in the generally longitudinally middle portion of the head supporting portion 11. The board opening 13 is formed in a generally rectangular shape in plan view. The board opening 13 extends through the head supporting portion 11 in the thickness direction.

The tongue portion 14 is formed in a generally rectangular shape in plan view so as to rearwardly extend from the generally widthwise middle portion of the front-side peripheral edge portion of the board opening 13. The rear end edge of the tongue portion 14 is located on the front side of the rear-side peripheral edge portion of the board opening 13 to be spaced apart therefrom.

The wire supporting portion 12 is formed in a flat belt shape continued from the rear end portion of the head supporting portion 11 to extend rearwardly.

The insulating base layer 7 is provided on the metal supporting board 6 (on one side in the thickness direction, the same holds true hereinafter). The insulating base layer 7 is formed in a flat belt shape extending in the front-rear direction. The insulating base layer 7 includes a terminal formation portion 15, and a wire formation portion 16.

The terminal formation portion 15 is formed in a generally rectangular shape in plan view having a tapered rear end portion in the front end portion of the insulating base layer 7. The terminal formation portion 15 is stacked on the head supporting portion 11. The both widthwise end edges of the terminal formation portion 15 are located widthwise inwardly of the both widthwise end edges of the board opening 13. The terminal formation portion 15 is formed with a base opening 17.

The base opening 17 is formed in a generally rectangular shape in plan view in the generally longitudinally middle portion of the terminal formation portion 15. The base opening 17 extends through the terminal formation portion 15 in the thickness direction. The base opening 17 overlaps the widthwise middle portion of the board opening 13 so as to expose the tongue portion 14 of the head supporting portion 11. The rear-side peripheral edge portion of the base opening 17 is located rearwardly of the rear end edge of the tongue portion 14 to be spaced apart therefrom.

The wire formation portion 16 is formed in a flat belt shape extending continuously rearwardly from the rear end edge of the terminal formation portion 15. The wire formation portion 16 is stacked on the wire supporting portion 12.

The first conductive pattern 8 is provided on the insulating base layer 7. The first conductive pattern 8 includes a plurality of (eight) head connection terminals 18, a plurality of (eight) external-side connection terminals 27, and a plurality of (eight) first wires 19.

The head connection terminals 18 are placed on the front side of the base opening 17. Each of the head connection terminals 18 is formed in a generally rectangular shape in plan view. The individual head connection terminals 18 are arranged in parallel to be spaced apart from each other in the widthwise direction.

Each of the external-side connection terminals 27 is connected to an external wired circuit board (not shown) or the like. In accordance with the configuration of the external wired circuit board (not shown), the shape, position, and bonding method of the external-side connection terminal 27 can optionally and selectively be determined Specifically, in the present embodiment, the external-side connection terminals 27 are placed on the rear end portion of the wire formation portion 16. Each of the external-side connection terminals 27 is formed in a generally rectangular shape in plan view. The external-side connection terminals 27 are arranged to be spaced apart from each other in the widthwise direction.

The first wires 19 are formed in mutually spaced-apart relation so as to be continued to the corresponding head connection terminals 18 and the corresponding external-side connection terminals 27.

The second conductive pattern 9 is provided on the insulating base layer 7. The second conductive pattern 9 includes a plurality of (two) piezoelectric element connection terminals 20, a plurality of (two) power source terminals 28, and a plurality of (two) second wires 21.

The piezoelectric element connection terminals 20 are placed on the rear side of the base opening 17. Each of the piezoelectric element connection terminals 20 is formed in a generally rectangular shape in plan view. The individual piezoelectric element connection terminals 20 are arranged in parallel to be spaced apart from each other in the widthwise direction.

Each of the power source terminals 28 is connected to the external wired circuit board (not shown) or the like. In accordance with the configuration of the external wired circuit board (not shown), the shape, position and bonding method of the power source terminal 28 can optionally and selectively be determined Specifically, in the present embodiment, each of the power source terminals 28 is placed widthwise inwardly of all the external-side connection terminals 27 on the rear end portion of the wire formation portion 16. Each of the power source terminals 28 is formed in a generally rectangular shape in plan view. The individual power source terminals 28 are arranged in parallel to be spaced apart from each other in the widthwise direction.

The individual second wires 21 are formed in mutually spaced-apart relation so as to be continued to the corresponding piezoelectric element connection terminals 20 and the corresponding power source terminals 28.

The insulating cover layer 10 is formed in a pattern exposing the head connection terminals 18, the external-side connection terminals 27, the piezoelectric element connection terminals 20, and the power source terminals 28 and covering the first wires 19 and the second wires 21 on the insulating base layer 7.

The suspension board with circuit 2 also includes a plurality of (two) junction walls 22.

The junction walls 22 are provided on the rear end portion of the tongue portion 14 and arranged to be spaced apart from each other in the widthwise direction. Each of the junction walls 22 is formed in a generally U-shaped shape in plan view having an open rear end portion to upwardly protrude from the top surface of the tongue portion 14. Each of the junction walls 22 integrally includes a facing portion 23 and a pair of restraining portions 24.

The facing portion 23 is located in the front end portion of each of the junction walls 22. The facing portion 23 is formed in a generally linear shape in plan view extending in the widthwise direction.

The two restraining portions 24 are each formed in a generally linear shape in plan view rearwardly extending from the both widthwise end portions of the facing portion 23.

The slider 4 is supported on the front end portion of the tongue portion 14. The front end portion of the tongue portion 14 serves as a slider mounting portion. The slider 4 is formed in a generally rectangular shape in plan view. The front end portion of the slider 4 is located on the insulating base layer 7 on the rear side of each of the head connection terminals 18. When the hard disc drive (not shown) is driven, the slider 4 floats over a magnetic disk (not shown) with a minute gap being interposed therebetween, while traveling relative thereto.

The magnetic head 3 is provided in the front end portion of the slider 4. The magnetic head 3 is solder-bonded to each of the head connection terminals 18.

Each of the piezoelectric elements 5 is formed in a generally rectangular shape in plan view extending in the longitudinal direction. The front end portion of each of the piezoelectric elements 5 is bonded to the rear end portion of the tongue portion 14 via a bonding agent 25 on the rear side of the corresponding facing portion 23. The rear end portion of each of the piezoelectric elements 5 is bonded to the corresponding piezoelectric element connection terminal 20 via the bonding agent 25. To each of the piezoelectric elements 5, electric power is supplied via the second conductive pattern 9, and the voltage thereof is controlled to expand/contract the piezoelectric element 5 in the front-rear direction. The rear end portion of the tongue portion 14 and the piezoelectric element connection terminals 20 serve as a piezoelectric element mounting portion.

Next, a producing method of the suspension board with circuit 2 is described with reference to FIGS. 3A to 4B.

In the method, as shown in FIG. 3A, the metal supporting board 6 is prepared first.

Examples of a material for forming the metal supporting board 6 include a metal material such as stainless steel, a 42-alloy, aluminum, a copper-beryllium alloy, or phosphor bronze. Preferably, stainless steel is used.

The metal supporting board 6 has a thickness in a range of, e.g., not less than 15 µm and, e.g., not more than 50 µm, or preferably not more than 30 µm.

Then, as shown in FIG. 3B, to the top surface of the metal supporting board 6, a varnish of a photosensitive insulating material is applied, dried, exposed to light, developed, and cured by heating to form the insulating base layer 7 and each of the junction walls 22 in the pattern described above.

Examples of a material for forming the insulating base layer 7 include an insulating material such as a synthetic resin such as, e.g., a polyimide resin, a polyamide imide resin, an acrylic resin, a polyether nitrile resin, a polyether sulfone resin, a polyethylene terephthalate resin, a polyethylene naphthalate resin, or a polyvinyl chloride resin. Preferably, a polyimide resin is used.

The insulating base layer 7 has a thickness in a range of, e.g., not less than 1 µnm, or preferably not less than 3 µm and, e.g., not more than 35 µm, or preferably not more than 15 µm.

Each of the junction walls 22 has the same thickness as that of the insulating base layer 7 which is, e.g., not less than 1 µm, or preferably not less than 3 µm and, e.g., not more than 35 µm, or preferably not more than 15 µm.

Next, as shown in FIG. 3C, on the top surface of the insulating base layer 7, the first conductive pattern 8 and the second conductive pattern 9 are formed by an additive method, a subtractive method, or the like.

Examples of a material for forming the first conductive pattern 8 and the second conductive pattern 9 include a conductive material such as copper, nickel, gold, a solder, or an alloy thereof. Preferably, copper is used.

Each of the first conductive pattern 8 and the second conductive pattern 9 has a thickness in a range of, e.g., not less than 3 µm, or preferably not less than 5 µm and, e.g., not more than 50 µm, or preferably not more than 20 µm.

Each of the first wires 19 and the second wires 21 has a width in a range of, e.g., not less than 5 µm, or preferably not less than 8 µm and, e.g., not more than 200 µm, or preferably not more than 100 µm.

The widthwise spacing between the individual first wires 19 is in a range of, e.g., not less than 5 µm, or preferably not less than 8 µm and, e.g., not more than 1000 µm, or preferably not more than 100 µm. On the other hand, the widthwise spacing between each of the first wires 19 and the second wire 21 closest thereto is in a range of, e.g., not less than 5 µm, or preferably not less than 8 µm and, e.g., not more than 1000 µm, or preferably not more than 100 µm.

Each of the head connection terminals 18 has a width in a range of, e.g., not less than 15 µm, or preferably not less than 20 µm and, e.g., not more than 1000 µnm, or preferably not more than 800 µm.

The spacing between the individual head connection terminals 18 is in a range of, e.g., not less than 15 µm, or preferably not less than 20 µm and, e.g., not more than 1000 µm, or preferably not more than 800 µm.

Each of the piezoelectric element connection terminals 20 has a width in a range of, e.g., not less than 15 µm, or preferably not less than 20 µm and, e.g., not more than 1000 µm, or preferably not more than 800 µm.

The spacing between the individual piezoelectric element connection terminals 20 is in a range of, e.g., not less than 15 µm, or preferably not less than 20 µm and, e.g., not more than 1000 µm, or preferably not more than 800 µm.

Then, as shown in FIG. 4A, to the top surface of the insulating base layer 7, a varnish of a photosensitive insulating material is applied so as to cover the first conductive pattern 8 and the second conductive pattern 9, dried, exposed to light, developed, and cured by heating to form the insulating cover layer 10 in the pattern described above.

As a material for forming the insulating cover layer 10, the same insulating material as the insulating material of the insulating base layer 7 shown above is used. The insulating cover layer 10 has a thickness in a range of, e.g., not less than 1 µm and, e.g., not more than 40 µm, or preferably not more than 10 µm.

Next, as shown in FIG. 4B, the board opening 13 is formed, while the metal supporting board 6 is trimmed into the outer shape described above.

To process the metal supporting board 6, a method such as, e.g., an etching method such as dry etching (e.g., plasma etching) or wet etching (e.g., chemical etching), drilling perforation, or laser processing is used. Preferably, the metal supporting board 6 is processed by an etching method.

In this manner, the suspension board with circuit 2 is completed.

Next, referring to FIGS. 1 and 2, a description is given of the mounting of the piezoelectric elements 5 on the suspension board with circuit 2.

To mount the piezoelectric elements 5 on the suspension board with circuit 2, first, a liquid droplet of the bonding agent 25 is placed inside each of the junction walls 22 of the suspension board with circuit 2, i.e., between the two restraining portions 24.

As the bonding agent 25, a bonding agent is used which is in the form of a liquid when applied and then solidified to be able to bond the piezoelectric elements 5. Specifically, a conductive adhesive in which metal particles are dispersed in a resin or a conductive bonding agent such as a solder is used.

Then, the front end portion of each of the piezoelectric elements 5 is placed inside the junction wall 22 so as to overlap the liquid droplet of the bonding agent 25.

At this time, the liquid droplet of the bonding agent 25 is collapsed by the front end portion of the piezoelectric element 5 to spread along the top surface of the tongue portion 14 and fill the space inside the junction wall 22. As a result, the bonding agent 25 comes into contact with a rear end surface 26 as the facing surface of the facing portion 23 and the inner surfaces of the two restraining portions 24 in the lateral direction. That is, the facing portion 23 defines the front end portion of the space inside the junction wall 22 in which the bonding agent 25 is placed. The facing portion 23 is placed on the front side of the bonding agent 25 to face the bonding agent 25. The two restraining portions 24 are placed widthwise outside the bonding agent 25 to face the bonding agent 25.

Thereafter, when the bonding agent 25 is solidified, the bonding of the front end portion of each of the piezoelectric elements 5 to the tongue portion 14 is completed. Thus, the piezoelectric elements 5 and the tongue portion 14 are electrically connected.

In addition, the rear end portions of the piezoelectric elements 5 are bonded to the piezoelectric element connection terminals 20 using the bonding agent 25. Thus, the piezoelectric element 5 and the piezoelectric element connection terminals 20 are electrically connected.

When the electric power supplied to one of the piezoelectric elements 5 is controlled to expand the piezoelectric element 5, one end portion of the tongue portion 14 moves to the front side. At this time, the other piezoelectric element 5 is contracted to move the other end portion of the tongue portion 14 to the rear side and thus move the magnetic head 3 in the widthwise direction.

In the case where the junction walls 22 are not provided, due to the expansion of the piezoelectric element 5, the upper end portion of the bonding agent 25 may be elastically deformed to the front side and a distance over which the tongue portion 14 moves may accordingly be shorter than a distance over which the piezoelectric element 5 expands.

By contrast, in the head gimbal assembly 1 and the suspension board with circuit 2, as shown in FIG. 2, the bonding agent 25 for bonding the piezoelectric elements 5 fills the space inside each of the junction walls 22 provided on the tongue portion 14. That is, the peripheral edge portion of the bonding agent 25 is reinforced by the junction wall 22 to inhibit the bonding agent 25 from being elastically deformed.

As a result, when the piezoelectric element 5 expands, the bonding agent 25 serves to press the facing portion 23 and thus allow the force resulting from the expansion of the piezoelectric element 5 to be efficiently transmitted to the tongue portion 14 via both of the bonding agent 25 and the junction wall 22.

Accordingly, it is possible to more efficiently move the magnetic head 3 to an intended position than in the case where no junction wall 22 is provided, while reducing the distance over which the piezoelectric element 5 expands.

This can achieve a reduction in power consumption.

Also, in the head gimbal assembly 1 and the suspension board with circuit 2, as shown in FIG. 2, the facing portion 23 defines the front end portion of the region where the bonding agent 25 is placed.

This allows the bonding agent 25 to reliably stay on the rear side of the facing portion 23 in proximate relation thereto.

As a result, it is possible to cause the facing portion 23 and the bonding agent 25 to reliably face each other.

Also, in the head gimbal assembly 1 and the suspension board with circuit 2, as shown in FIG. 1, the restraining portions 24 are provided which are located to face the bonding agent 25 in the widthwise direction.

Accordingly, when the piezoelectric elements 5 are bonded, it is possible to restrain the flow of the bonding agent 25 in the widthwise direction using the restraining portions 24.

As a result, it is possible to allow the bonding agent 25 to more reliably stay on the rear side of the facing portion 23 in proximate relation thereto and cause the facing portion 23 and the bonding agent 25 to more reliably face each other.

In the head gimbal assembly 1 and the suspension board with circuit 2, as shown in FIG. 1, the restraining portions 24 are formed integrally with the facing portion 23.

This allows the restraining portions 24 to reinforce the facing portion 23 and allows the facing portion 23 to efficiently receive the pressing force from the bonding agent 25.

In the head gimbal assembly 1 and the suspension board with circuit 2, as shown in FIG. 3B, the junction walls 22 are made of the same material as that of the insulating base layer 7 and formed at the same time as when the insulating base layer 7 is formed.

As a result, it is possible to efficiently form the junction walls 22 in the step of forming the insulating base layer 7.

Also in the head gimbal assembly 1 and the suspension board with circuit 2, as shown in FIG. 1, the rear end surface 26 of the facing portion 23 extends in the widthwise direction perpendicular to the expanding direction (i.e., direction extending from the rear side to the front side) of the piezoelectric element 5.

Accordingly, it is possible to allow the facing portion 23 to reliably receive the pressing force from the bonding agent 25 and reliably transmit the force resulting from the expansion of the piezoelectric element 5 to the facing portion 23.

Also, in the head gimbal assembly 1 and the suspension board with circuit 2, as shown in FIG. 2, the front end portions of the piezoelectric elements 5 are electrically bonded to the tongue portion 14.

(Second Embodiment)

Figure 6:
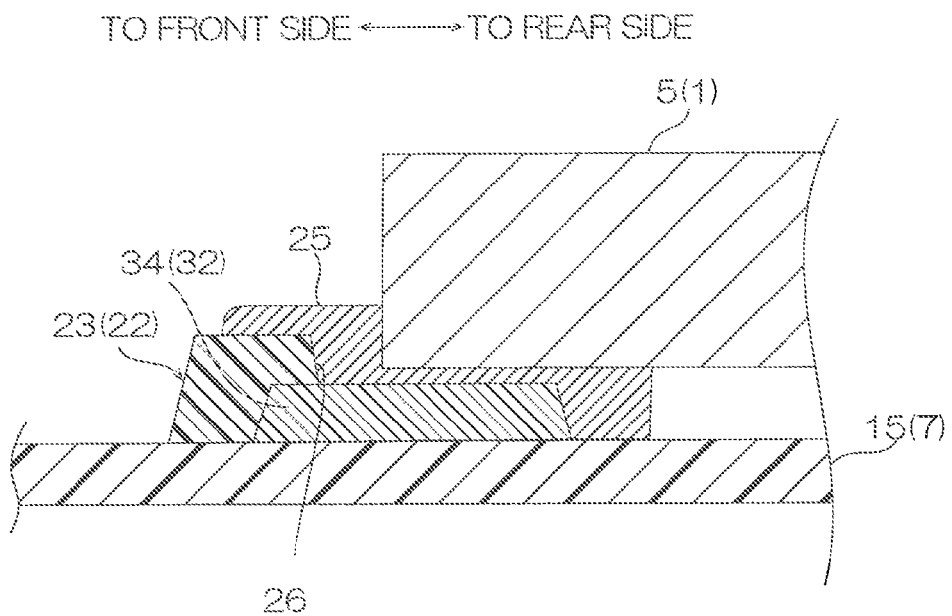
FIG. 6 is a cross-sectional view along the line B-B of FIG. 5.

Referring to FIGS. 5 and 6, the head gimbal assembly 1 in a second embodiment of the present invention is described. Note that, in the second embodiment, the same members as those in the first embodiment described above are designated by the same reference numerals and a description thereof is omitted.

In the first embodiment described above, the piezoelectric elements 5 are placed to extend in the front-rear direction such that the front end portions thereof are bonded to the top surface of the rear end portion of the tongue portion 14.

By contrast, in the second embodiment, as shown in FIGS. 5 and 6, the piezoelectric elements 5 are placed to be inclined from the front-rear direction such that the front end portions thereof are bonded to the top surface of the insulating base layer 7 on both widthwise sides of the base opening 17 and located widthwise outside the rear end portions thereof. That is, in the second embodiment, each of the piezoelectric elements 5 expands in a direction extending widthwise outwardly with approach to the front side and contracts in a direction extending widthwise inwardly with approach to the rear side.

In this case, a suspension board with circuit 31 has a second conductive pattern 32 including a plurality of (two) rear-side terminals 33, a plurality of (two) front-side terminals 34, a plurality of (two) rear-side wires 35, and a plurality of (two) front-side wires 36.

The rear-side terminals 33 are placed on the rear side of the base opening 17. Each of the rear-side terminals 33 is formed in a generally rectangular shape in plan view. The individual rear-side terminals 33 are arranged in parallel to be spaced apart from each other in the widthwise direction.

The front-side terminals 34 are placed on both widthwise sides of the base opening 7. Each of the front-side terminals 34 is formed in a generally rectangular shape in plan view.

The rear-side wires 35 are formed to be spaced apart from each other and continued to the corresponding rear-side terminals 33.

The front-side wires 36 are formed to be spaced apart from each other and continued to the corresponding front-side terminals 34.

Each of the junction walls 22 is placed in a direction extending widthwise outwardly with approach to the front side so as to face the corresponding front-side terminal 34. Each of the junction walls 22 is formed in a generally U-shaped shape in plan view having an open end portion which faces in a direction extending widthwise inwardly with approach to the rear side so as to surround the front end portion of the corresponding front-side terminal 34.

The front end portions of the piezoelectric elements 5 are bonded to the corresponding front-side terminals 34 using the bonding agent 25 in the same manner as in the first embodiment described above.

In the second embodiment also, the same function/effect as obtained in the first embodiment described above can be obtained.

(Third Embodiment)

Figure 7A:
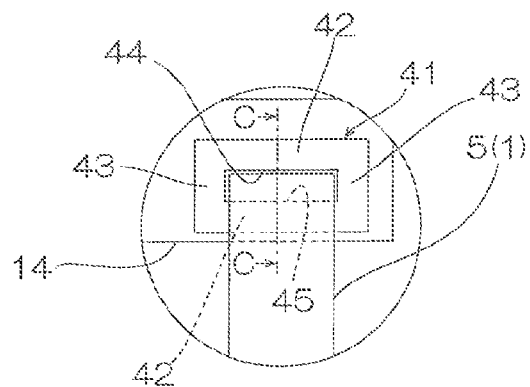
FIG. 7A is an illustrative view illustrating each of junction walls in a third embodiment, which is a plan view.
Figure 7B:
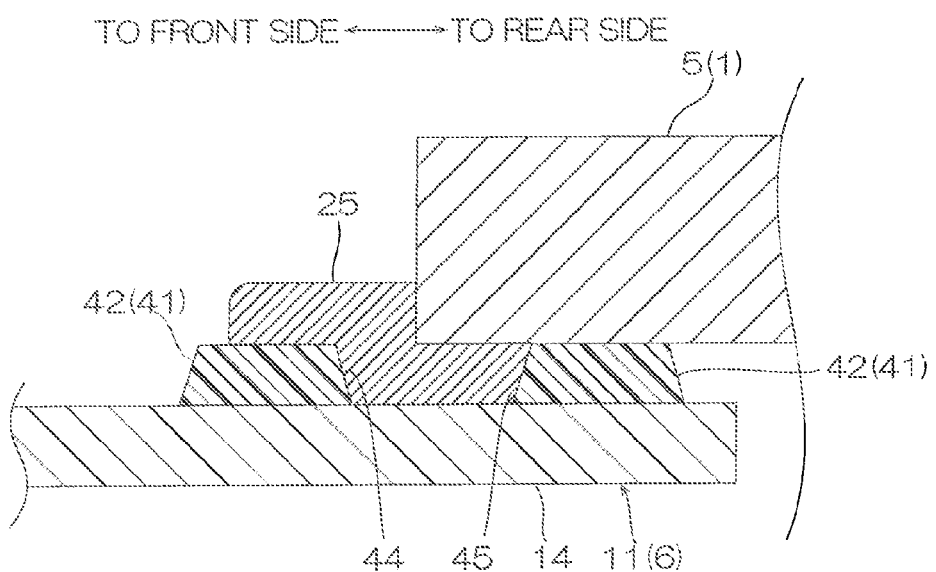
FIG. 7B is an illustrative view illustrating the junction wall in the third embodiment, which is a cross-sectional view along the line C-C of FIG. 7A.

Referring to FIGS. 7A and 7B, the head gimbal assembly 1 in a third embodiment of the present invention is described. Note that, in the third embodiment, the same members as those in the first embodiment described above are designated by the same reference numerals and a description thereof is omitted.

In the first embodiment described above, each of the junction walls 22 is formed in a generally U-shaped shape in plan view having the open rear end portion.

By contrast, in the third embodiment, as shown in FIG. 7A, each of junction walls 41 is formed in a generally rectangular frame shape in plan view.

In this case, each of the junction walls 41 includes a pair of facing portions 42 arranged to be spaced apart from each other in the front-rear direction and a pair of restraining portions 43 arranged to be spaced apart from each other in the widthwise direction.

Each of the two facing portions 42 is formed in a generally linear shape in plan view extending in the widthwise direction.

Each of the two restraining portions 43 is formed in a generally linear shape in plan view extending in the front-rear direction so as to couple the both widthwise end portions of either of the two facing portions 42.

As shown in FIG. 7B, the front end portions of the piezoelectric elements 5 are bonded to the tongue portion 14 using the bonding agent 25 in the same manner as in the first embodiment described above. The bonding agent 25 fills the space inside each of the bonding walls 41 to come in contact with a rear end surface 44 of the front-side facing portion 42, a front end surface 45 of the rear-side facing portion 42, and the widthwise inner surfaces of the two restraining portions 43.

According to the third embodiment, when each of the piezoelectric elements 5 expands, the bonding agent 25 presses the rear end surface 44 of the front-side facing portion 42. On the other hand, when each of the piezoelectric elements 5 contracts, the bonding agent 25 presses the front end surface 45 of the rear-side facing portion 42.

Thus, the magnetic head 3 can efficiently be moved not only when the piezoelectric element 5 expands, but also when the piezoelectric element 5 contracts to allow a reduction in power consumption.

In the third embodiment also, the same function/effect as obtained in the first embodiment described above can be obtained.

Note that, in the second embodiment described above, the junction walls 41 of the third embodiment can also be used appropriately instead of the junction walls 22 of the second embodiment. That is, in the second embodiment described above, as shown in FIG. 13, the junction walls 22 can also be formed so as to surround the front-side terminals 34.

(Fourth Embodiment)

Figure 8A:
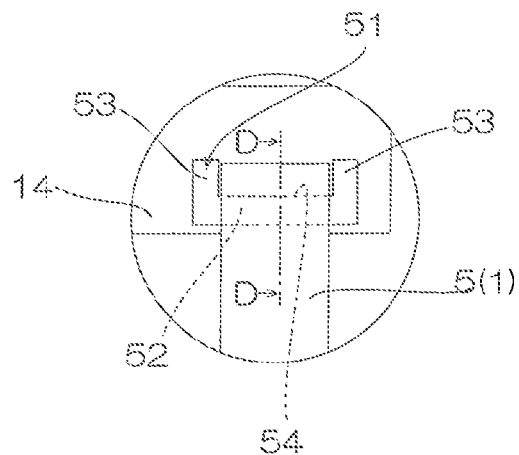
FIG. 8A is an illustrative view illustrating the junction wall in a fourth embodiment, which is a plan view.
Figure 8B:
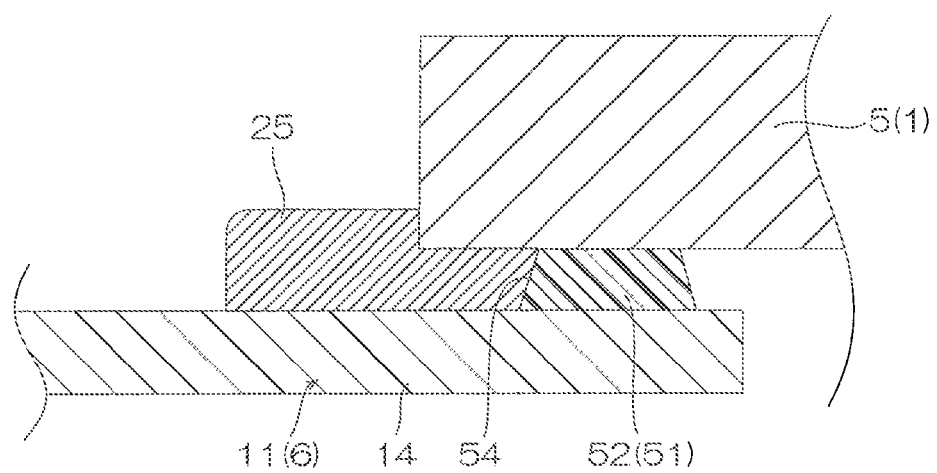
FIG. 8B is an illustrative view illustrating the junction wall in the fourth embodiment, which is a cross-sectional view along the line D-D of FIG. 8A.

Referring to FIGS. 8A and 8B, the head gimbal assembly 1 in a fourth embodiment of the present invention is described. Note that, in the fourth embodiment, the same members as those in the first embodiment described above are designated by the same reference numerals and a description thereof is omitted.

In the first embodiment described above, each of the junction walls 22 is formed in a generally U-shaped shape in plan view having the open rear end portion.

By contrast, in the fourth embodiment, as shown in FIG. 8A, each of junction walls 51 is formed in a generally U-shaped shape in plan view having an open front end portion.

In this case, each of the junction walls 51 includes a facing portion 52 and a pair of restraining portions 53.

The facing portion 52 is located in the rear end portion of the junction wall 51. The facing portion 52 is formed in a generally linear shape in plan view extending in the widthwise direction.

Each of the two restraining portions 53 is formed in a generally linear shape in plan view extending from the both widthwise end portions of the facing portion 52 to the front side.

As shown in FIG. 8B, the front end portions of the piezoelectric elements 5 are bonded to the tongue portion 14 using the bonding agent 25 in the same manner as in the first embodiment described above. The front end edge of each of the piezoelectric elements 5 is located on the front side of a front end surface 54 of the facing portion 52. The bonding agent 25 fills the space inside each of the bonding walls 51 to come in contact with the front end surface 54 of the facing portion 52 and the widthwise inner surfaces of the two restraining portions 53.

According to the fourth embodiment, when the piezoelectric element 5 contracts, the bonding agent 25 presses the front end surface 54 of the facing portion 52.

Thus, the magnetic head 3 can efficiently be moved when the piezoelectric element 5 contracts to allow a reduction in power consumption.

In the fourth embodiment also, the same function/effect as obtained in the first embodiment described above can be obtained.

Note that, in the second embodiment described above, the junction walls 51 of the fourth embodiment can also be used appropriately instead of the junction walls 22 of the second embodiment. That is, in the second embodiment described above, the junction walls 22 can also be formed so as to surround the rear end portions of the front-side terminals 34.

(Other Embodiments)

Figure 10A:
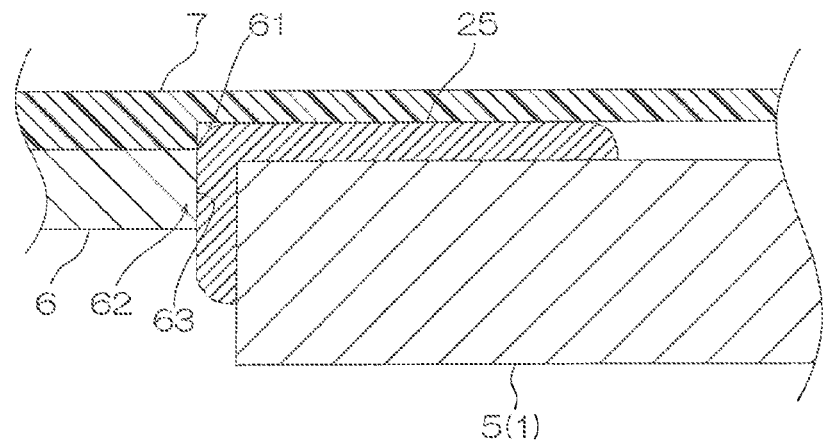
FIG. 10A is an illustrative view illustrating a recessed portion in still another embodiment and showing an eighth embodiment.
Figure 10B:
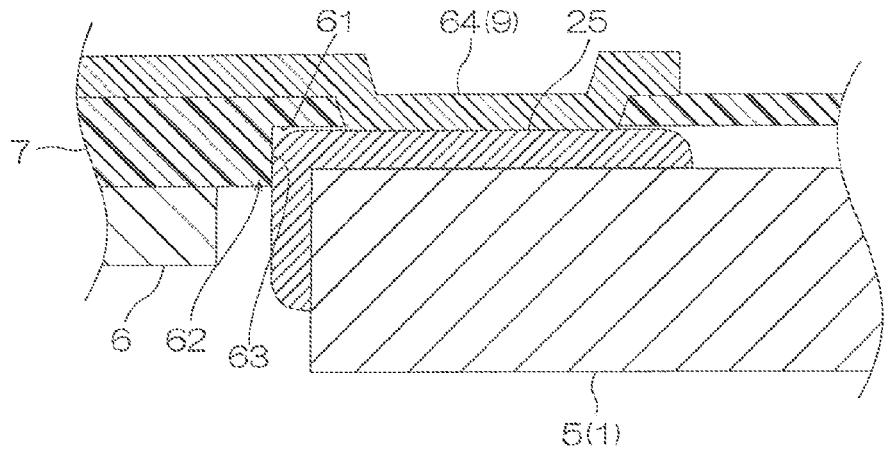
FIG. 10B is an illustrative view illustrating the recessed portion in yet another embodiment and showing a ninth embodiment.

Referring to FIGS. 9A and 10B, the head gimbal assembly 1 in each of the other embodiments of the present invention is described. Note that, in each of the embodiments, the same members as those in the first embodiment described above are designated by the same reference numerals and a description thereof is omitted.

In the first embodiment described above, each of the junction walls 22 integrally includes the facing portion 23 and the restraining portions 24. However, as in, e.g., the fifth embodiment shown in FIG. 9A, the facing portion 23 and the restraining portions 24 may also be formed discretely so as to be spaced apart from each other.

Alternatively, as in, e.g., the sixth embodiment shown in FIG. 9B, each of the junction walls 22 may also be formed only of the facing portion 23 without including the restraining portions 24.

Otherwise, as in, e.g., the seventh embodiment shown in FIG. 9C, the facing portion 23 may also be placed so as to be inclined from the expanding/contracting direction (i.e., front-rear direction) of each of the piezoelectric elements 5. In this case, the rear end surface 26 of the facing portion 23 has a generally V-shaped shape in plan view such that an angle θ in a range of, e.g., not less than 45°, or preferably not less than 60° and, e.g., less than 90° is formed between the rear end surface 26 and the expanding/contracting direction of the piezoelectric element 5.

In the first embodiment described above, the piezoelectric elements 5 are bonded to the upper surface of the suspension board with circuit 2 by filling the space inside each of the junction walls 22 formed on the upper surface of the suspension board with circuit 2 with the bonding agent 25. However, as in, e.g., the eighth embodiment shown in FIG. 10A or the ninth embodiment shown in FIG. 10B, the piezoelectric elements 5 may also be bonded to the lower side of the suspension board with circuit 2 by filling a recessed portion 61 formed under the suspension board with circuit 2 with the bonding agent 25.

The recessed portion 61 is formed by etching the metal supporting board 6 and the insulating base layer 7.

In this case, a front-side peripheral wall 62 of the recessed portion 61 serves as a facing portion and an inner peripheral surface 63 of the front-side peripheral wall 62 serves as a facing surface.

In the eighth embodiment shown in FIG. 10A, the piezoelectric elements 5 are electrically connected to the metal supporting board 6. In the ninth embodiment shown in FIG. 10B, the piezoelectric elements 5 are electrically connected to flying lead terminals 64 provided in the second conductive pattern 9.

Figure 11:
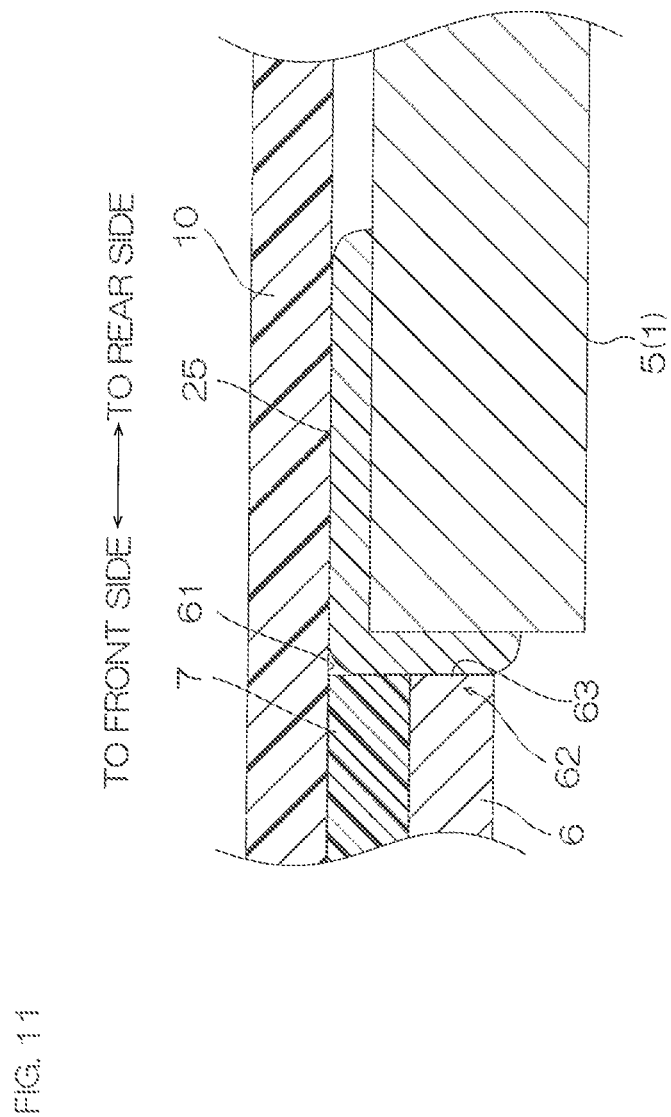
FIG. 11 is an illustrative view illustrating the recessed portion in a tenth embodiment.

As in the tenth embodiment shown in FIG. 11, in the eighth embodiment described above, it is also possible to form the insulating cover layer 10 over the insulating base layer 7 and form the recessed portion 61 by entirely etching the insulating base layer 7 so as to expose the insulating cover layer 10.

Alternatively, in the ninth embodiment described above, the insulating cover layer 10 covering the flying lead terminals 64 can also be formed.

Figure 12A:
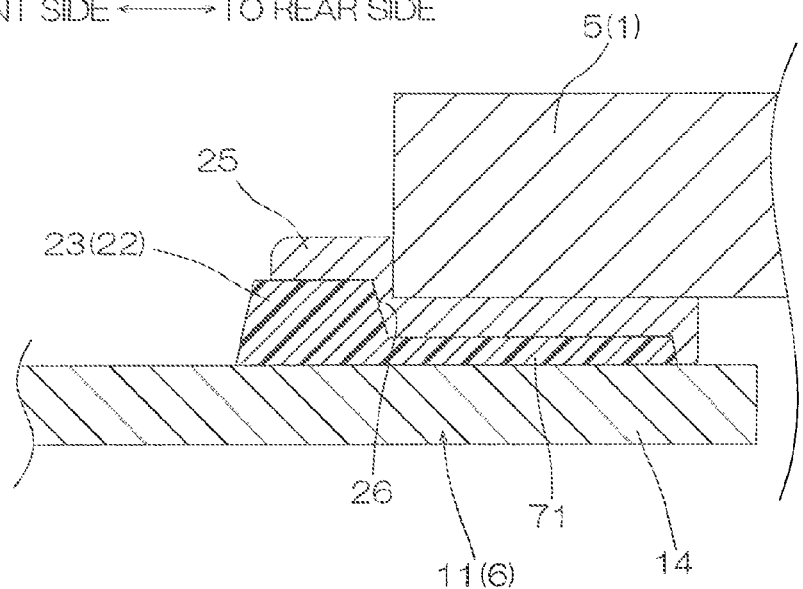
FIG. 12A is an illustrative view illustrating the junction wall in still another embodiment and showing an eleventh embodiment.

As in the eleventh embodiment shown in FIG. 12A, in the first embodiment described above, the lower end portion of each of the junction walls 22 may also be provided with a bottom wall 71 made of the insulating base layer 7. In this case, when each of the piezoelectric elements 5 is bonded to the tongue portion 14, the bonding agent 25 is brought into contact with the tongue portion 14 so as to overflow from the rear end point of the junction wall 22.

Note that, in the fourth embodiment described above also, in the same manner as in the eleventh embodiment, the lower end portion of each of the junction walls 51 can also be provided with the bottom wall 71 made of the insulating base layer 7.

Figure 12B:
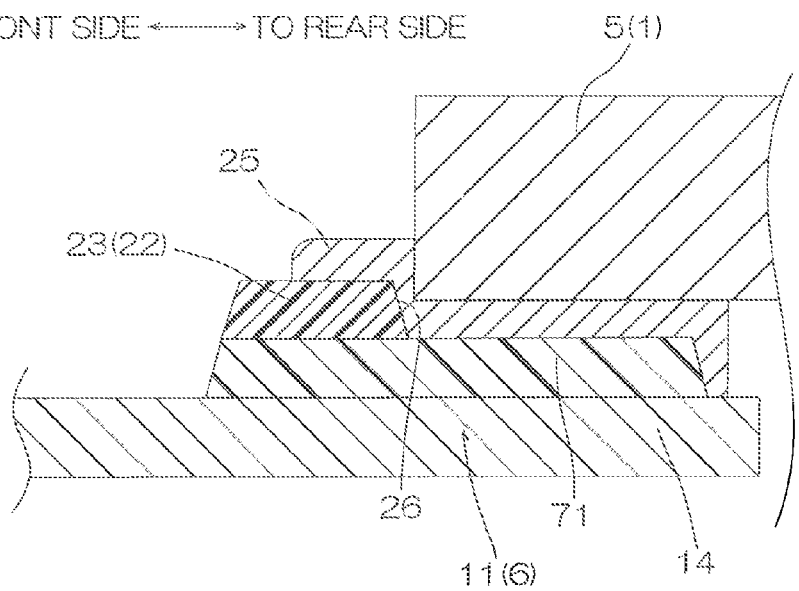
FIG. 12B is an illustrative view illustrating the junction wall in yet another embodiment and showing a twelfth embodiment.

As in the twelfth embodiment shown in FIG. 12B, in the first embodiment described above, it is also possible to form the bottom walls 71 each made of the insulating base layer 7 and form the junction walls 22 each made of the insulating cover layer 10 on the bottom walls 71.

According to the twelfth embodiment, the junction walls 22 can efficiently be formed using the insulating cover layer 10.

In the fourth embodiment described above also, in the same manner as in the twelfth embodiment, it is possible to provide the bottom walls 71 each made of the insulating base layer 7 and form the junction walls 22 each made of the insulating cover layer 10 on the bottom walls 71.

Figure 14A:
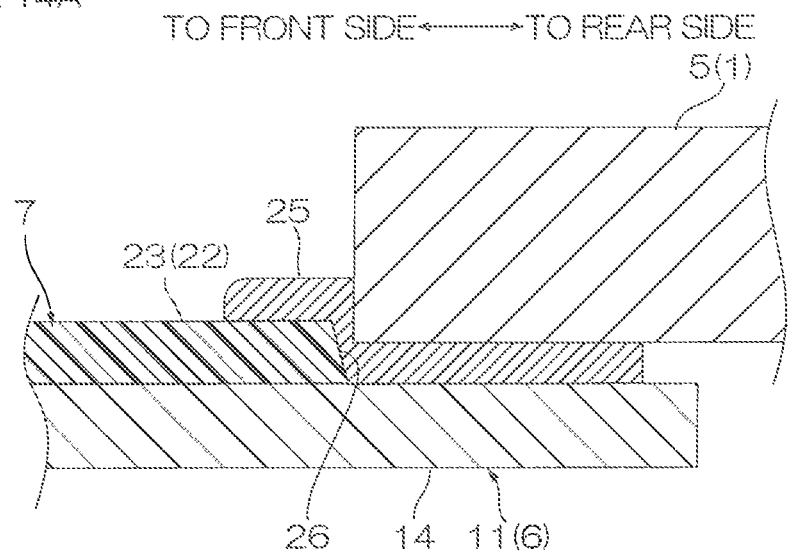
FIG. 14A is an illustrative view illustrating the junction wall in still another embodiment and showing a thirteenth embodiment.

In the first embodiment described above, the junction walls 22 are provided on the tongue portion 14 independently of the other portion of the insulating base layer 7. However, in the thirteenth embodiment, as shown in FIG. 14A, each of the junction walls 22 can be provided integrally with the other portion of the insulating base layer 7 (the portion thereof other than the junction walls 22).

Figure 14B:
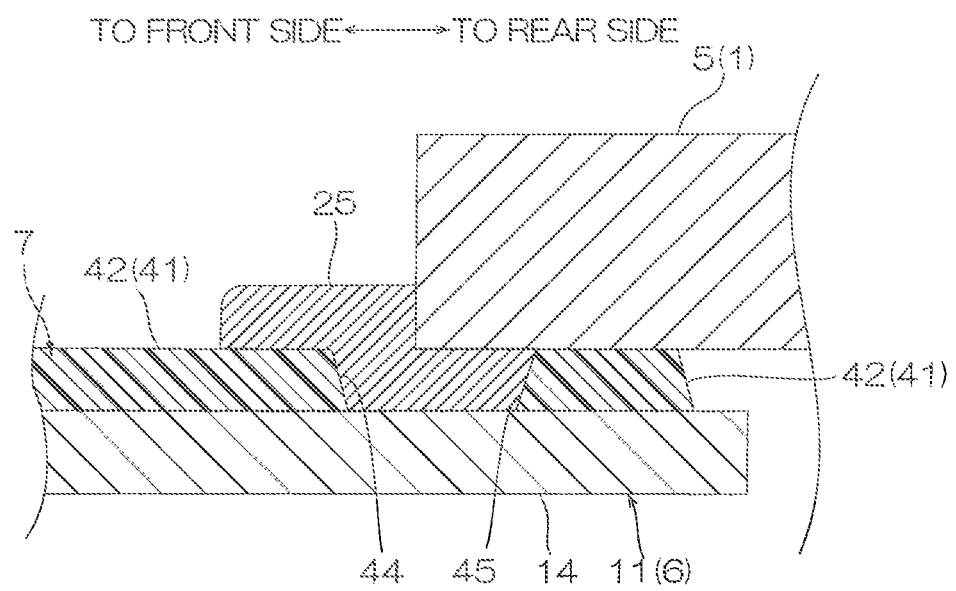
FIG. 14B is an illustrative view illustrating the junction wall in yet another embodiment and showing a fourteenth embodiment.

In the third embodiment described above also, in the same manner as in the fourteenth embodiment shown in FIG. 14B, each of the junction walls 41 can be provided integrally with the other portion of the insulating base layer 7 (the portion thereof other than the junction walls 41).

Figure 15A:
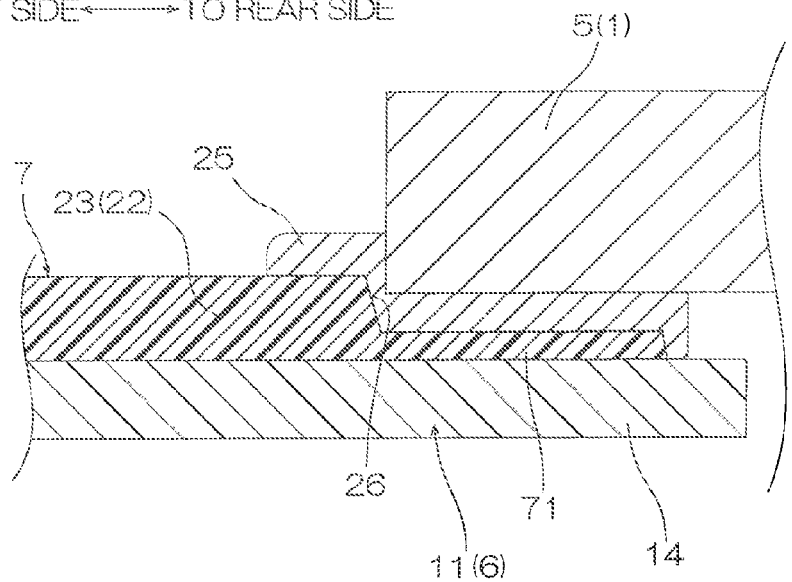
FIG. 15A is an illustrative view illustrating the junction wall in still another embodiment and showing a fifteenth embodiment.

In the eleventh embodiment described above also, in the same manner as in the fifteenth embodiment shown in FIG. 15A, each of the junction walls 22 can be provided integrally with the other portion of the insulating base layer 7 (the portion thereof other than the junction walls 22).

Figure 15B:
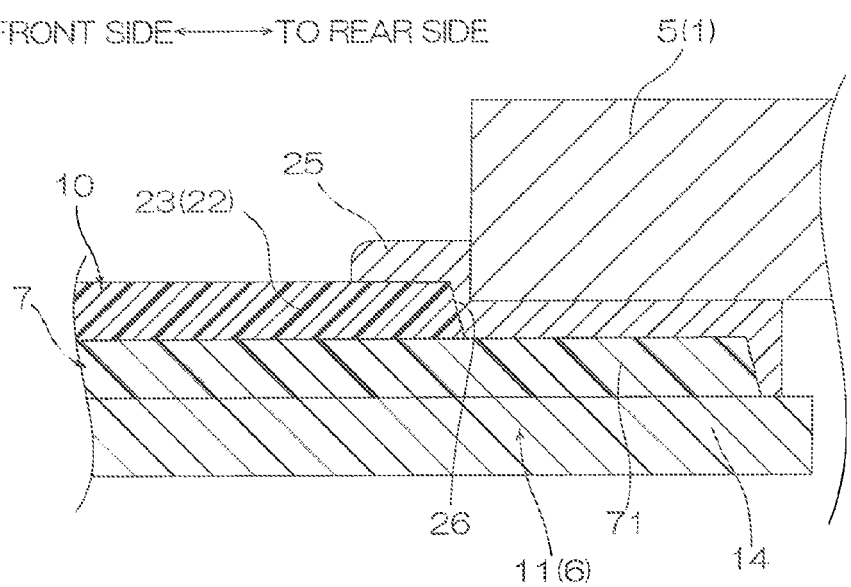
FIG. 15B is an illustrative view illustrating the junction wall in yet another embodiment and showing a sixteenth embodiment.

In the twelfth embodiment described above also, in the same manner as in the sixteenth embodiment shown in FIG. 15B, each of the junction walls 22 can be provided integrally with the other portion of the insulating cover layer 10 (the portion thereof other than the junction walls 22).

Figure 16A:
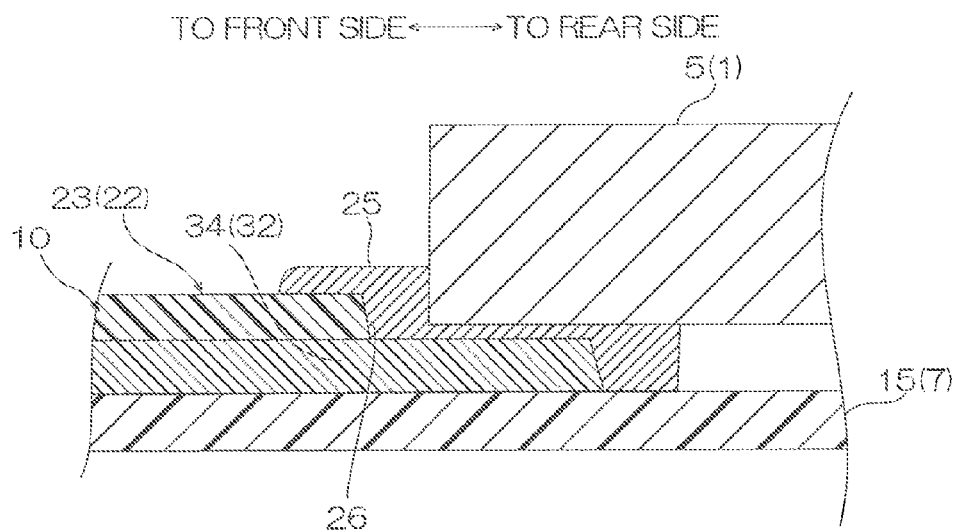
FIG. 16A is an illustrative view illustrating the junction wall in still another embodiment and showing a seventeenth embodiment.

In the second embodiment described above also, in the same manner as in the seventeenth embodiment shown in FIG. 16A, each of the junction walls 22 can be provided integrally with the other portion of the insulating cover layer 10 (the portion thereof other than the junction walls 22).

Figure 13:
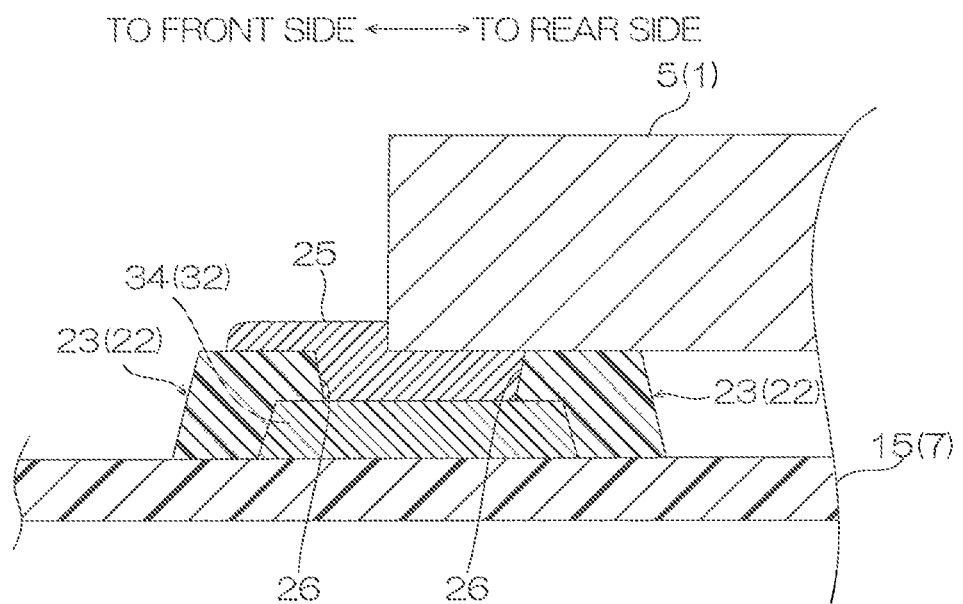
FIG. 13 is an illustrative view illustrating a modification of the second embodiment.
Figure 16B:
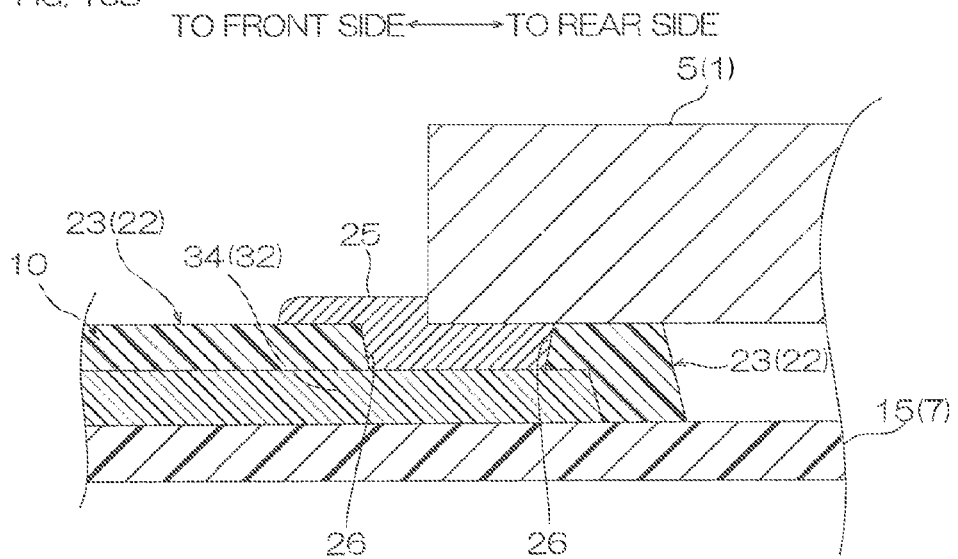
FIG. 16B is an illustrative view illustrating the junction wall in yet another embodiment and showing an eighteenth embodiment.

In a modification of the third embodiment shown in FIG. 13 also, in the same manner as in the eighteenth embodiment shown in FIG. 16B, each of the junction walls 22 can be provided integrally with the other portion of the insulating cover layer 10 (the portion thereof other than the junction walls 22).

Figure 17A:
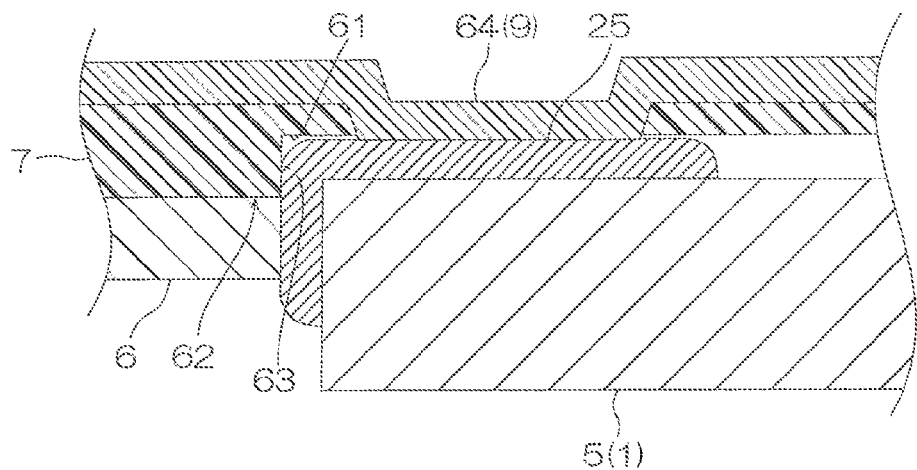
FIG. 17A is an illustrative view illustrating the junction wall in still another embodiment and showing a nineteenth embodiment.

In the ninth embodiment described above, the rear-side end edge of the metal supporting board 6 is located on the front side of the rear-side end edge of the insulating base layer 7 defining the front-side end portion of the recessed portion 61. However, in the nineteenth embodiment, as shown in FIG. 17A, the rear-side end edge of the metal supporting board 6 may also be located to be flush with the rear-side end edge of the insulating base layer 7 defining the front-side end portion of the recessed portion 61 in the front-rear direction.

Figure 17B:
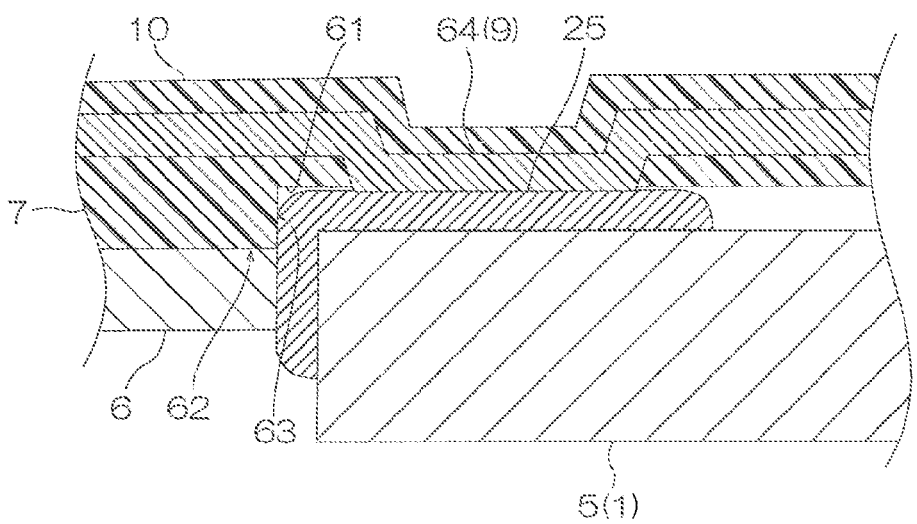
FIG. 17B is an illustrative view illustrating the junction wall in yet another embodiment and showing a modification of the nineteenth embodiment

In the nineteenth embodiment described above, as shown in FIG. 17B, the insulating cover layer 10 can also be formed to cover the flying lead terminals 64.

It is also possible to combine the first embodiment described above with each of the embodiments.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit, comprising:
   a metal supporting board;
   an insulating base layer provided on the metal supporting board;
   a conductive pattern provided on the insulating base layer;
   a piezoelectric element mounting portion for mounting thereon a piezoelectric element; and
   a slider mounting portion for mounting thereon a slider including a magnetic head, the slider mounting portion being movable with expansion/contraction of the piezoelectric element, wherein
   the conductive pattern is configured to be electrically connected to the piezoelectric element,
   the piezoelectric element mounting portion includes a junction wall having a facing portion placed on one side of a bonding agent for bonding the piezoelectric element to the piezoelectric element mounting portion in an expanding/contracting direction of the piezoelectric element so as to face the bonding agent, and at least one restraining portion placed to face the bonding agent in a widthwise direction of the suspension board with circuit, the widthwise direction being perpendicular to the expanding/contracting direction, and
   the facing portion is configured to be pressed by the bonding agent when the piezoelectric element bonded to the piezoelectric element mounting portion expands/contracts.

2. A suspension board with circuit according to claim 1, wherein the facing portion defines at least a part of a region of the piezoelectric element mounting portion where the bonding agent is placed.

3. A suspension board with circuit according to claim 1, wherein the at least one restraining portion is formed integrally with the facing portion.

4. A suspension board with circuit according to claim 1, wherein the facing portion is formed of at least either one of the metal supporting board and the insulating base layer.

5. A suspension board with circuit according to claim 1, further comprising:
   an insulating cover layer provided on the insulating base layer so as to cover the conductive pattern, wherein
   the facing portion is formed of the insulating cover layer.

6. A suspension board with circuit according to claim 1, wherein the facing portion has a facing surface which crosses the expanding/contracting direction so as to form an angle of 45° to 90° therebetween.

7. A suspension board with circuit according to claim 1, wherein the bonding agent is a conductive adhesive.

8. A suspension board with circuit according to claim 1, wherein the bonding agent is a solder.

9. A suspension board with circuit according to claim 1, wherein the junction wall is generally U-shaped in a plan view having an open rear end portion and protruding in a thickness direction with respect to the suspension board with circuit, such that the junction wall integrally includes the facing portion and a pair of restraining portions.

10. A head gimbal assembly, comprising:
    a suspension board with circuit;
    a piezoelectric element supported on the suspension board with circuit; and
    a slider on which a magnetic head is mounted and which is supported on the suspension board with circuit so as to move with expansion/contraction of the piezoelectric element, wherein
    the suspension board with circuit includes a metal supporting board, an insulating base layer provided on the metal supporting board, a conductive pattern provided on the insulating base layer, a piezoelectric element mounting portion for mounting thereon the piezoelectric element, and a slider mounting portion for mounting thereon the slider including the magnetic head, the slider mounting portion being movable with the expansion/contraction of the piezoelectric element,
    the conductive pattern is configured to be electrically connected to the piezoelectric element,
    the piezoelectric element mounting portion includes a junction wall having a facing portion placed on one side of a bonding agent for bonding the piezoelectric element to the piezoelectric element mounting portion in an expanding/contracting direction of the piezoelectric element so as to face the bonding agent, and at least one restraining portion placed to face the bonding agent in a widthwise direction of the suspension board with circuit, the widthwise direction being perpendicular to the expanding/contracting direction,
    the facing portion is configured to be pressed by the bonding agent when the piezoelectric element bonded to the piezoelectric element mounting portion expands/contracts,
    the piezoelectric element has one end portion thereof in the expanding/contracting direction which is electrically bonded to the conductive pattern via the bonding agent,
    the piezoelectric element has the other end portion thereof in the expanding/contracting direction which is electrically bonded to the metal supporting board or the conductive pattern via the bonding agent, and
    the facing portion faces at least either one of the one end portion and the other end portion of the piezoelectric element in the expanding/contracting direction.

11. A head gimbal assembly according to claim 10, wherein the other end portion of the piezoelectric element in the expanding/contracting direction is electrically bonded to the metal supporting board.

12. A head gimbal assembly according to claim 10, wherein the junction wall is generally U-shaped in a plan view having an open rear end portion and protruding in a thickness direction with respect to the suspension board with circuit, such that the junction wall integrally includes the facing portion and a pair of restraining portions.

* * * * *